United States Patent [19]

Jung et al.

[11] 4,179,263

[45] Dec. 18, 1979

[54] PROCESS FOR THE UTILIZATION OF WASTE SUBSTANCES AND DEVICE FOR CARRYING OUT THE PROCESS

[75] Inventors: Fritz Jung, Vienna; Ludwig Kwech, Kaltenleutgeben, both of Austria

[73] Assignee: Perlmooser Zementwerke Aktiengesellschaft, Vienna, Austria

[21] Appl. No.: 846,340

[22] Filed: Oct. 28, 1977

[30] Foreign Application Priority Data

Oct. 29, 1976 [AT] Austria .................................. 8077/76

[51] Int. Cl.² .............................................. F24J 3/00
[52] U.S. Cl. ...................................... 432/1; 106/100; 110/346; 432/14
[58] Field of Search ....................... 110/219, 229, 346; 432/1, 14; 106/100

[56] References Cited

U.S. PATENT DOCUMENTS

| | | | |
|---|---|---|---|
| 819,127 | 5/1906 | Doherty | 432/1 |
| 3,996,862 | 12/1976 | Besik et al. | 110/219 |
| 4,089,697 | 5/1978 | Pennell | 432/14 |

FOREIGN PATENT DOCUMENTS 2410320 9/1975 Fed. Rep. of Germany.
2510339 9/1975 Fed. Rep. of Germany.

*Primary Examiner*—John J. Camby
*Attorney, Agent, or Firm*—Berman, Aisenberg & Platt

[57] ABSTRACT

The invention relates to a process for the utilization of waste substances containing combustible components and showing fluctuations in their composition and properties and to a device for carrying out the process.

The improvement comprises effecting the volatilization, decomposition and incomplete combustion of the waste substances in a first process step which is immediately followed by a second process step in which formed pyrolysis gases are burned in a heating device for burning starting materials for building materials or inorganic binders.

20 Claims, 1 Drawing Figure

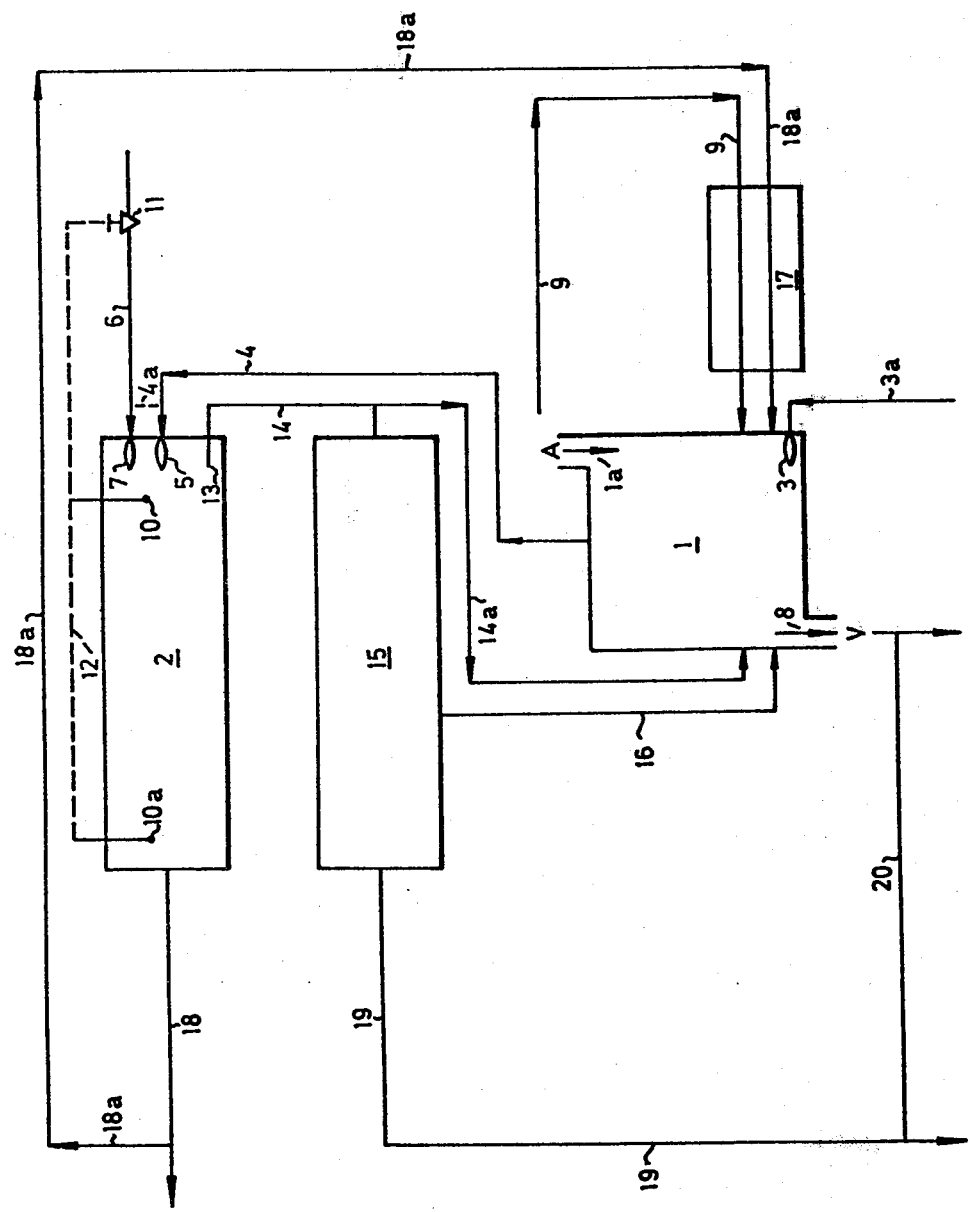

PROCESS FOR THE UTILIZATION OF WASTE SUBSTANCES AND DEVICE FOR CARRYING OUT THE PROCESS

The drastic increase in the price of conventional fuels makes it necessary to fine new sources of energy. Of particular interest in this are waste substances containing combustible components, i.e. of a calorific value whose utilization has not been possible up to now, for instance, either because it is difficult to transform them to a state suitable for conventional combustion, because their heating power is subject to unreasonable fluctuations or because they yield large amounts of combustion residues of varying composition and are problematic in use and dumping.

Examples for the first group of waste substances of high calorific value are industrial waste substances of plastic material or scrap tires. The calorific value of this type of waste is equivalent to that of high-grade conventional fuels, but the waste material has to be broken up at high cost and freed of undesirable components, such as steel inserts or the like. It cannot be used in conventional burning devices unless it is first broken up. Attempts have been made to break up tires, after cooling by means of liquid carbonic acid or nitrogen at temperatures of $-60°$ C., but this method has never been generally accepted. Moreover, the possibilities of using scrap tires reduced to small pieces, such as for heat-insulating floor coverings, bath mats, shoe soles and the like, have proven unsatisfactory for various reasons. On the other hand, environment protection forbids the storage of scrap tires and plastic scrap in garbage dumps in large amounts in which this type of material now collects.

Examples for the second group of waste substances are garbage, oil sludge, scrap oil, varnish residues, animal cadavers, sapropel (faulschlamm) and the like. A feature common to all these substances is a strongly fluctuating, at times comparatively low calorific value and considerable variance in volume and composition of the combustion residues.

Due to the difficulties outlined above, it is normally necessary to incinerate this waste material, possibly after costly processing, in separate plants without being able to utilize the energy inherent in it. In the case of waste material of strongly fluctuating heating power, it is often necessary, at least temporarily, to maintain the combustion process by additional, oil- or natural-gas-fired heating. This means that, in these cases, it is not only impossible to utilize the energy of the waste substances, but instead additional high-grade energy must be supplied. Such additional heating is normally indispensable, for environmental reasons, in order to prevent with absolute certainty an incomplete incineration which, in the case of plastic scrap material, scrap tires and other organic substances, not only gives rise to offensive odors, but also constitutes a health hazard. Even at complete incineration, storage of the combustion residues usually entails further considerable difficulties. Storage in the open air is problematic because of the danger of pollution, either of the subsoil water or, by dust particles, of the air. The processing of the collecting combustion residues is therefore of major importance.

Many ways of utilizing the waste substances mentioned above or for their uninjurious removal have been suggested.

It has been tried, for instance, to use garbage as a raw material in the cement industry, charging the garbage into a burning kiln. In this manner, the calorific value inherent in the garbage can be utilized and the remaining ashes react with the raw meal already present in the kiln to yield cement clinker. Difficulties in this process are caused by the fluctuation in heating power of the garbage and in the composition of the combustion residue. For this reason, it is necessary to know the calorific value of the garbage (as well as the exact composition of the combustion residue prior to utilization) in order adjust the amount of conventional fuel to be added and to consider the residue in composing the cement clinker raw meal. This naturally entails great expense and requires large stores of garbage and elaborate homogenizing plants.

In German Offenlegungsschrift No. 2,410,320, a process for burning rubber and plastic coatings off metal bodies under full retention of metal properties is described. The calorific value of the gases froming in the pyrolysis occurring in this process is not utilized. Instead, the heating power or calorific value of the pyrolysis gases is either not used at all or merely for preheating the metal bodies of for maintaining the low-temperature carbonizing process. The entire process is thus exclusively directed to the removal or combustion of a very small and specific group of waste substances, namely: plastic coatings on metallic bodies, in a plant specifically equipped for this purpose. The process step of the pyrolysis of the waste substances merely serves to burn them in a better-regulated and controlled manner than would be possible in normal combustion, with the ultimate aim of keeping the volume of flue gas discharged into the atmosphere within reasonable limits. This entails a comparatively large technical expenditure at simultaneously high loss of heating power inherent in these substances, as using this heat for technical purposes is not intended. In this process, a large share of the calorific value inherent in the pyrolysis gases or of the heat liberated in their combustion is destroyed in a cooling zone positioned downstream from the combustion chamber by injecting air or water.

German Offenlegungsschrift No. 2,510,339 describes a process in which halogen- and/or sulfur-containing waste substances are subjected to pyrolysis, the gases formed in pyrolysis are first purified and then subjected to combustion in order to destroy them. The pyrolysis in this process is effected exclusively for the purpose of reducing the amount of harmful halogen or sulfur compounds present in the flue gas. The device for carrying out the process consists of a pyrolysis chamber, a separate means for removing the halogen or sulfur compounds and a burner for burning off the pyrolysis gas. The energy inherent in the pyrolysis gas is used, in a manner similar to that described in connection with the preceding German publication, either not at all or only to a minor extent, such as for maintaining the pyrolysis itself or for heating the separate means for eliminating the halogen or sulfur compounds. Utilization of the pyrolysis gases outside of the waste incinerator plant is not intended. Moreover, the process is a discontinuous one.

It is an object of the present invention to provide a new advantageous process, including an operation resulting in incomplete combustion of waste substances, for instance a pyrolysis process, which makes it possible to utilize the considerable calorific value and heat generated in the pyrolysis process, inherent in the pyrolysis gases liberated from (combustible) waste substances of any given type, in an industrial process outside of the waste incineration process, at the same time and without additional expenditure, i.e. without an intermediate purifiation step costly to set up and operate, fully coming up to the requirements of environmental protection as far as the purity of the flue gases stemming from the waste incineration process are concerned.

According to the invention, the waste substances themselves are not charged into the heating device of an industrial process instead, they are first incompletely burned in a separate device of the low-temperature carbonizing furnace type. This device will be referred to as a "pyrolysis furnace" in the following. The gases formed in this heating process in the pyrolysis furnace, of high or low calorific value, depending upon the type of waste substances employed, are then conveyed to an industrial heating or burning device where they are completely burned, optionally together with conventional fuels. The heating residue, possibly remaining in the pyrolysis furnace, can then be continuously or discontinuously withdrawn and further used.

The object of the invention is thus an improved process for utilization of waste substances containing combustible components and possibly showing fluctuations in their composition and properties, particularly in their water content, their content of components undergoing endothermic reactions at heating and/or in their calorific value, for instance plastic material scrap, in particular polyethylene, polyvinyl acetate, polyamide, polyvinyl chloride and the like, in particular strings, hosiery, knitted fabric scrap material and similar plastic scrap material difficult to comminute, natural or artificial rubber products, in particular scrap automobile tires, rubber, trash, in particular garbage and/or bulk goods, abattoir scrap, fats and greases, animal cadavers, residuary acids, oxidizable toxins, for instance those containing cyano compounds, textiles, paper, wood, straw, sulfite waste liquors, phenol-containing waste products, oil-containing waste products from sewage purification plants of refineries or petrochemical plants, sediment from oil tanks and oil separators, oil-containing grits and grinds scum from sewage treatment plants, oil emulsions, waste from gasoline separators, waste oil, waste solvents, varnish residues, porous rock saturated with oil, paint or similar organic products, particularly perlite, contaminated earth or quicklime, stemming from tanker accidents, refinery sludge, printer's ink, faulschlamm (sapropel), oxidizing sludge, preliminary sedimentation and/or excess sludge, said process comprising the steps of subjecting the waste substances, at total or partial exclusion of air, to volatilization and/or decomposition under liberation of their volatile components and/or to incomplete combustion and of furning the gases thus formed, optionally under interposition of a storage device or buffer, optionally together with conventional fuels, the improvement comprising effecting the volatilization, decomposition and incomplete combustion of the waste substances in a first process step, optionally under interposition of a storage device, which is immediately followed by a second process step in which the pyrolysis gases formed at volatilization, decomposition and incomplete combustion of said waste substances are burned in a heating device, in particular a burning device, for the burning of starting raw materials for building materials or inorganic binders. Examples for building materials are bricks and for binders, hydraulic or non-hydraulic binders.

A further object of the invention in a process as described above is the improvement comprising effecting the volatilization, decomposition and/or incomplete combustion of the waste substances in a first process step which is immediately followed by a second process step in which the pyrolysis gases formed at volatilization, decomposition and/or incomplete combustion of said waste substances are burned together with conventional fuels in a heating device, in particular a burning device, for the burning of starting raw materials for building materials or binders, the amount of conventional fuels being controlled by means of measuring or determination of the heating state of the starting raw materials or binders subjected to heating within the heating device, in particular the burning device, of the second process step, this control achieving the regulation, adjustment and optionally desired or required constant level of the total heating power of the gases formed at volatilization, decomposition and/or incomplete combustion and the conventional fuels added. "Heating state" is understood to mean the state of the materials as a result of the heating process. The heating device or burning device is understood to mean a room, vessel, chamber or the like in which starting materials for the production of building materials or inorganic binders are heated and/or burned, preferably meaning a furnace or kiln. For measuring or determining the heating state of the building materials or binders, measuring of the temperature or of the degree of decarbonation or the like can be used. Combinations of these methods are also possible. The measuring of the heating state of the materials subjected to heating or burning is advantageously carried out in the sintering zone of the burning device. It can be further preferred to effect measurement of the heating state at the end of the calcining zone of the burning device which in the case of heat exchanger and Lepol kilns is at the inlet of the kiln. Measuring of the heating state of the material is advantageously effected by determination of the temperature or the degree of decarbonation of the material subjected to heating, by also by determining both parameters.

The process according to the invention combines, for the first time and in a manner never previously described, a process for the incomplete combustion of waste substances in a technically progressive manner with a process for the production of building materials and inorganic binders whose most essential feature is a heating, in particular a burning process.

In carrying out the process according to the invention, it was quite unexpected to find that energy (present in waste products or pyrolysis gases) which remained unused or was even destroyed in the known waste disposal processes, can be used advantageously to the largest extent possible. Equally unexpected was the discovery that pyrolysis gases contaminated with environment-polluting substances, such as sulfur dioxides, zinc-, lead- or halogen compounds, quite independently of the type of waste products used, do not in any way disturb the sensitive reactions in burning processes of building material or binder production, such as that of burning cement clinker, and that the process finally yields a flue gas which (compared to a gas formed in a burning process operated with conventional fuels) does not deviate in its composition and, if anything, is even purer. This simple and, at the same time, useful method brings about complete neutralization of environment-polluting substances formed in waste incineration.

A further secondary effect is an optionally-achieved improvement of the strength properties of cement clinker burned under heating with pyrolysis gases. A further effect resides in the possibility of omitting the post burning chamber provided for according to prior art, since this is formed by the directly-connected kiln for heating or burning building material or binder. A separate cooling or dust-precipitating operation is not required for burned pyrolysis gases, as this is included in the heating or burning process of the building material or binder itself and/or occurs in the cooling or dust-precipitating means actually required for the process and thus provided from the outset. A further factor worth mentioning is the reduced explosion hazard.

Due to the fact that the gases, for instance unsaturated hydrocarbons, formed in the pyrolysis furnace, are fed directly into the heating device in which they are completely combusted, a nuisance to the environment (offensive odors, health hazard due to unsaturated hydrocarbon products and the like), such as had to be expected in waste incineration processes prior to now, does not occur. According to the process of the invention, it is thus not necessary, in contrast to known processes, to carry out the waste incineration with a high excess of air under all circumstances in order to prevent an environmental nuisance caused by incomplete combustion due to a sudden increase in calorific value, such as by plastic material in garbage and/or a sudden decrease in the content in substances undergoing endothermic reaction at heating. On the contrary, the waste substances are heated with an excess of air insufficient for complete combustion, at air deficiency or at exclusion of air. Inheating, an incomplete combustion is thus at all times aimed at and achieved. Because the thermal effect is strongly impaired at the high excess of air normally required for combustion, the process according to the invention, for this reason alone, results in a better yield of the energy inherent in the waste substances; high-grade additional energy is thus not required. Fluctuations in the water content and/or in the content of components undergoing endothermic reactions at heating and/or in the calorific value of the waste substances only affect the degree of incompleteness of combustion, which is not significant, as the process of the invention does not aim at anything but an incomplete combustion of the waste substances. A post-burning chamber, such as is required in known processes for the utilization or incineration of waste substances, is completely omitted in the process according to the present invention. The gases formed at heating or incomplete combustion of the waste substances (according to the process of the invention) are completely burned there because they are directly conveyed for further use to the heating device of a building material or binder production process. For this reason, they do not require further treatment in the form of cooling, purification, dust precipitation, dust filtration or the like. The heat inherent in them is also fully utilized. At incomplete combustion in the first process step of the process, according to the invention, explosions caused by highly-inflammable, low boiling substances can be much more-readily prevented than in known processes, as the volatilized gases are immediately and continuously withdrawn from the pyrolysis furnace and passed to a heating or burning device where they are completely combusted.

It is preferred to burn gases (formed in the first process step from waste substances) immediately in a second process step provided for burning or heating starting raw materials for cement clinker, namely: in the high-temperature zone of the second process step where temperatures of more than 600° C. (in particular of in particular more than 850° C., advantageously of more than 1100° C. and preferably of more than 1200° C.) prevail. This yields excellent results with respect to of the purity of the flue gases.

Advantageously, the volatilization/decomposition of the waste substances and/or the liberation of the gases formed at incomplete combustion is promoted by maintaining a pressure of 2.84 to 11.38 psi in the waste heating device of the first process step.

According to a preferred embodiment of the process, the temperature in the heating device of the first process step (provided for volatilization, decomposition and/or incomplete combustion of waste substances) is adjusted and essentially kept constant by increasing the amount of gas removed when the temperature increases and reducing the amount of gas removed when the temperature decreases. If the temperature in the pyrolysis furnace increases, for instance due to a decrease in the water content of the waste substances, more gas, optionally automatically, can be removed from the pyrolysis furnace and a further increase of temperature in the furnace is thus prevented. When the temperature in the pyrolysis furnace decreases, the amount of gas removed is decreased and the temperature decrease ceases. The temperature in the waste heating furnace, thus adjusted or kept constant, secures the best utilization of energy inherent in the waste substances. This preferred manner of operating further safely prevents an over-heating of the waste pyrolysis furnace, which frequently occurs in known processes due to sudden changes in the composition and/or properties of the waste substances and causes the formation of melts, scabs and scars, the excessive volatilization of volatile components, such as alkali-, sulfur-, chloride or fluoride compounds and corrosion phenomena, particularly in the refractory lining of the waste pyrolysis furnace.

A favorable embodiment of the process of the invention comprises supplying additional heat to the heating device of the first process step provided for the incomplete combustion of the waste substances. This can be achieved, for instance, by means of heating with conventional burners fired by conventional fuels.

It is preferred to supply additional heat to the first process step (provided for the volatilization, decomposition and/or incomplete combustion of waste substances) by adding hot starting raw materials, in particular cement clinker or quicklime, which had previously been heated within the second process step, in particular in a burning device.

According to a further advantageous variant, the additional heat is supplied in the form of hot gases, particularly of the hot flue gases obtained in a separate process, said gases having temperatures of 200°–1000° C., advantageously 300°–800° C. and in particular 400°–600° C. It is particularly advantageous to conduct part of the kiln flue gases in this way to the first process step either directly or indirectly in the event that a bypass must be provided in the second process step within the range of the heat exchangers due to the hazard of attack by alkali-, sulfate or chloride compounds.

According to a particularly preferred embodiment, the hot gases added to the first process step (provided for the volatilization, decomposition and/or incomplete combustion) are kiln flue gases formed in burning the starting raw materials for hydraulic or non-hydraulic binders, in particular cement clinker, and/or the hot gases or hot air derived from the direct and/or indirect heat exhange in cooling the burned substances, in particular the cement clinker, during the second process step. The temperature of these gases lies within the ranges indicated above. By changing the heat thus supplied, the temperature within the pyrolysis furnace of the first step can be adjusted and controlled as desired and optionally kept constant. This is particularly practical during the starting period of operation of the kiln or when the kiln has to be operated at increased or decreased rate, or when waste substances of very varying properties or of low calorific value are to be employed. Such hot gases at the temperature indicated above form in many branches of industry as inferior gases which can not presently be used at all or can only be used to a limited extent. As a specific example, the hot cooling air formed in cooling hot Portland cement clinker according to known processes, which is normally used only partially, perhaps for preheating the air supplied to the burner, should be mentioned. The remainder of this air has not been utilized in the majority of cases.

Suitable heating devices (i.e. the low-temperature carbonizing furnaces which are referred to here as "pyrolysis furnaces") of the first process step in which the heating and incomplete combustion of the waste substances are carried out are, e.g., rotary kilns, such as are used in the cement industry, shaft furnaces, fluidized bed furnaces, step furnaces, roasting furnaces, sintering (belt) furnaces and the like.

Advantageous in this is an embodiment of the process in which the temperature within the heating device provided for the incomplete combustion of the waste substances is adjusted and/or essentially kept constant by charging the waste substances into, or conveying them through, the heating device at differing or adjustable rates. At increase of temperature, for instance, the conveying rate is increased, while it is decreased at decreasing temperature. Adjustment of the conveying rate can be varied, for instance in the case of a rotary kiln, by changing the rotating rate, in the case of a shaft furnace by changing the rate at which the combustion residue is removed, and in the case of a roasting furnace or of a sintering furnace by changing the conveying rate of the grate or the sintering belt, in the case of a step furnace by changing the rotating rate of the agitating arms. A further possibility of influencing the temperature in the heating device involves changing the amount of waste substances charged, for instance in the case of roasting furnaces or sintering furnaces, by changing the depth of the layer on the grate or sintering belt.

It will be clear to the man of the art that two or all of the previously noted measures for adjusting and optionally keeping constant the temperature in the pyrolysis furnace can be used simultaneously and side by side. It might further prove advantageous to add heat only temporarily and when required, such as at the time of starting operations.

For reasons of economy, the water content of the waste substances intended for incomplete combustion can be decreased prior to charging said substances into the pyrolysis furnace by means of mechanical dehydration, for instance by means of vacuum rotary filters, centrifuges, filter presses and the like, or by chemical means, for instance by adding quicklime and/or calcium hydroxide, and/or by means of drying, optionally using hot flue gases or other types of excess heat.

Examples for the conventional fuels to be added to the second process step in the process according to the invention are natural gas, fuel oil, coal dust or mixtures thereof.

When using additional conventional fuels in the second process step, the gases formed at incomplete combustion and the at least one conventional fuel can be fed into the heating device, in particular the burning device, by means of a common burner.

Favorable in regard to the effectiveness of combustion is a manner of operating which provides for the gases formed at incomplete combustion, optionally with additional air, to be used as a carrier medium for the conventional fuel, in particular for coal dust and/or for improving the atomization of a conventional liquid fuel, for instance fuel oil, and/or as a second gaseous fuel share in a gaseous fuel, such as natural gas, in particular for regulating the flame shape.

In the process according to the invention, the high temperature in the burning kilns of the second process step which, e.g., in burning cement amounts to about 1450° C. and in burning lime to about 1150° C., with the temperature within the kiln even several hundred degrees higher, secures the complete combustion of the products formed at the incomplete combustion of the first process step, thus preventing environment pollution. The gases can either be directly injected into the kiln or, which is particularly advantageous, as mentioned, can be used as a carrier medium for conventional fuels. A further advantage resides in the fact that the gases from the waste pyrolysis furnace can also contain harmful volatile components, such as sulfur and/or alkali compounds, as the gases are normally used after their combustion as furnace flue gases in a known manner for drying the raw materials, e.g., in grinding drying mills where the volatile components condense on the raw material or react therewith and can thus not be discharged into the atmosphere. Of particular interest in this context are the gases rich in zinc oxide which form while heating rubber products, in particular scrap tires, an constitute and essential nuisance for the environment. When employing the process according to the invention in connection with a cement clinker production process, the zinc oxides introduced into the burning kiln, together with incompletely burned gases, are precipitated on the cement clinker raw meal where they react to form calcium zincate. This compound is not only completely harmless, but also considerably increases the strength-forming value of the clinker.

It is of advantage in view of an intended simplicity of the regulation of the heating process in the second process step to add a mixture of the gases formed at incomplete combustion and conventional fuels in $Nm^3$ natural gas equivalents at a ratio of 1:30 to 1:1, preferably 1:20 to 1:2.5 and in particular 1:10 to 1:4.

A very simple and effective regulation of heating during the second process step, at complete freedom of operation in heating the waste substances containing combustible components, is made possible by a process variant according to which the ratio of gases formed at volatilization, decomposition and/or incomplete combustion in the first process step to conventional fuels is adjusted and controlled by means of measuring the heating state, for instance measuring the temperature and/or the degree of decarbonation of the heating raw materials within the sintering zone of the heating or burning device of the second process step, in particular the sintering zone of the burning device of the second process step.

According to a further variant of the process of the invention, the ratio of gases formed at the volatilization, decomposition and/or incomplete combustion in the first process step to conventional fuels is adjusted and controlled by means of measuring or determining the heating state of the raw materials burned, preferably by determining the temperature or the degree of decarbonation, at the end of the calcining zone of the burning device, in particular at the kiln inlet in the case of heat exchanger and Lepol kilns.

When employing the process of the invention in the building material industry, the device for determining the heating state of the material to be heated is preferably a device for determining the degree of decarbonation. The devices mentioned which serve as "sensors" can thus be arranged in the sintering zone of a rotary kiln. The devices for determining the degree of decarbonation are preferably arranged at the end of the calcining zone of the burning device, which (particularly in the case of heat exchanger or Lepol kilns) is at the kiln inlet.

It is further of advantage that heating residues (possibly formed at incomplete combustion in the pyrolysis furnace of the first process step) can be further processed (when employing the process according to the invention) in the building-material industry without difficulty since these heating residues normally consist essentially of compounds of lime, silicic acid, alumina and ferric oxide. According to an embodiment of the invention, they can therefore be used, optionally after homogenization, as raw material for, for instance, cement clinker, hydraulic lime, highly-hydraulic lime or Roman lime. It is thus of advantage to add all or part of the heating residue formed at incomplete combustion of the waste substances to the raw meal which is burned in the second burning device. This variant is particularly advantageous when the heating residue still contains small amounts of unburned components which are not interesting for reasons of heating power, but might cause difficulties in the event the residue is used for other purposes.

The ash and dust particles (possibly discharged with gases formed in the pyrolysis furnace in the first process step) can be directly taken into consideration in the composition of the raw meal for the heating of which these gases are used. Optionally, they can be removed from the gas after the pyrolysis furnace, but before further processing according to one of the conventional processes and can optionally be added to the raw meal prior to its charging into the burning kiln.

According to a further variant, the combustion residues stemming from incomplete combustion of waste substances can be used as latent-hydraulic (blast-furnace-slag-like) or pozzolana-type grinding additions or additives in the production of hydraulic binders containing grinding additions, such as cement with grinding additions, mixed binders, plaster and masonry binders, masonry mortars, white limes or hydraulic limes containing grinding additions, ready-to-use plasters, gypsum-containing plasters or binders and the like and/or as an additive in the processing of these binders.

A further object of the invention is an apparatus for carrying out the process of the invention. The apparatus for carrying out the process according to the invention is explained with reference to the accompanying drawing.

The apparatus essentially comprises a first heating device 1 (low-temperature carbonizing furnace or pyrolysis furnace), optionally provided with heat-supplying means 3 for the volatilization, decomposition and/or incomplete combustion of waste substances containing combustible components, a second heating device 2, in particular a burning kiln, a first line 4 for carrying off the gases formed in the first heating device 1, said line 4 being connected with a burner 5 arranged within the second heating device 2, a second line 6 for conveying the conventional fuels into the second heating device 2, and, optionally, a discharge means 8 which preferably operates discontinuously and is arranged in or on the first heating device 1 for the removal of the heating residue formed at heating the waste substances.

Within this basis system, there exist various possibilities for even better utilization of the heat and waste substances employed.

For instance, the burned hot material, for instance cement clinker, is removed at the outlet 13 of the burning kiln 2 and from there is passed through the outlet 14, for instance a shaft, either to the cooling means 15, for instance a clinker cooler, the cooling air heated there by the hot material can be conducted from the cooling means 15 via a line 16 to the first heating device 1 for the direct or indirect heating of the waste substances.

A further possibility consists in branching off the hot material from the outlet 14, even before it reaches the cooling means 15, through the inlet 14a, into the first heating device 1 where it can transfer the heat inherent in it to the waste substances to be subjected to low-temperature carbonizing treatment or to incomplete combustion.

The waste substances A themselves can either be charged into the heating device 1 through the inlet 1a direct or through a line 9 first to the heat exchanger 17 for preheating. The heating medium for the heat exchanger 17 can be the hot flue gases passed from the second heating means 2, in particular a burning kiln, through the lines 18, 18a; these gases can be put to, optionally direct, use in the first heating device 1 for heating the waste substances.

The combustion residue V are either removed from the first heating device 1 by the discharge means 8 or added or mixed at the desired ratio through line 20 to the material from the burning process, for instance cooled clinker, which was cooled in the cooler 15 and discharged therefrom through line 19. But, as already mentioned, the combustion residue can also be added through a line (not shown) to the raw meal charged into the heating device 2 for burning therein. Such an addition of residues to the raw meal is particularly advantageous when only the components easy to volatilize are liberated in the pyrolysis furnace, while components difficult to volatilize of coke-like consistency remain in the residue. For the optionally-desired heating of the waste substances by means of conventional fuels, a line 3a with a burner 3 arranged within the heating device 1 can be provided.

Advantageously, the first heating device 1 for the volatilization, decomposition and/or incomplete combustion of waste substances has the form of a shaft furnace, rotary tubular kiln, fluidized bed kiln, step furnace, roasting furnace or sintering furnace.

For controlling and regulating the total heating power of conventional fuel and the pyrolysis gases formed in the first heating device, the second heating device 2, within the line 6 for supplying conventional fuels to the second heating device, is provided with a flow regulating device 11 for regulating the flow of conventional fuels, said device 11 being controllable, optionally via a line 12, by a device 10, 10a for determining the heating state of the material to be heated. The device 10, 10a preferably is a temperature measuring device or a device for determining the degree of decarbonation.

Each of these devices can be arranged in the sintering zone of the heating or burning device. A device for determining the degree of decarbonation essentially consists of a sampling device which passes a sample of the sintering or calcined material from the kiln to the outside where an automatic determination of the carbonate content occurs. The measuring value thus obtained is used, taking into consideration the original carbonate content of the starting materials, for controlling the flow regulating means for conventional fuels.

It is preferred to arrange the temperature measuring device 10, 10a and/or the device 10, 10a for determining the degree of decarbonation of the heated material at the end of the calcining zone, which in the case of heat exchanger and Lepol kilns is in the kiln inlet.

It is particularly preferred to join the first line 4 for carrying off the gases formed in the first heating device 1 to the second line 6 for supplying conventional fuel downstream from its orifice into the burner 7 or within the burner 7 itself. It is particularly preferred to join the lines 4 and 6 at the burner jet. The respective line is indicated with 4a in the figure. As already mentioned, this permits utilization of said gases as a carrier medium for solid conventional fuel, such as coal dust, or for improving the atomization of a liquid conventional fuel, such as fuel oil, and/or as a second gaseous fuel share in a gaseous fuel, such as natural gas, in particular for controlling the flame shape.

The invention is explained in detail by means of the following, by no means limiting examples.

EXAMPLE 1

A cylindrical pyrolysis vessel was used in an electrically-fired kiln. The pyrolysis vessel was provided with a gas-tight lid, a heat-insulated connecting piece extended from the top of the lid to a semi-technical cement burning kiln where it terminated in a gas burner. Arranged parallel to this burner in the kiln was a second burner which could be fired with a conventional natural gas-oxygen mixture. The cement rotary kiln in the form of a tub was not inclined. This allowed leaving the material to be burned in the kiln until sintering was completed. Arranged downstram of the rotary kiln was a raw meal shot bed in the form of a Lepol grate through which the hot kiln flue gases discharged from the kiln were passed. The grate with the raw meal shot on it was slowly moved so that the kiln flue gases were essentially cooled in the course of the test after passing through the grate. The raw meal shot was subsequently burned to cement clinker in a conventional manner, this will be reverted to later on. The waste substance charged into the pyrolysis vessel consisted of 8 kg car tire granulate of a particle size of 3 mm. The temperature in the pyrolysis vessel was adjusted to 700° C. The pyrolysis gases escaping at this temperature were passed to the cement rotary kiln as described. The kiln had previously been brought to temperature by means of the burner fired with natural gas and charged immediately before the test with about 7 kg of pressed raw meal tablets of precalcined marl (of about 10 mm height, 10 mm diameter, chemical composition 65.0% CaO, 20.8% $SiO_2$, 7.1% $Al_2O_3$ and 2.6% $Fe_2O_3$). During the test, the mixing ratio of pyrolysis gas to conventional natural gas in the fuel fed to the kiln was so changed that the temperature in the kiln remained practically constant. After leaving the kiln, the flue gases, which were now composed of the combusted pyrolysis gas and the combusted natural gas, were passed through the raw meal shot bed as described. The composition of the raw meal shot was the same as that of the kiln charge, but the raw meal shot was not calcined and thus showed an annealing loss (ignition loss) of 36.2 percent and a moisture content of 10.4 percent.

The pyrolysis gases were burned in this way in the kiln for a period of 60 minutes. After this time, the clinker formed in the kiln showed a free lime content of 2.7 percent. With this clinker, cement was ground in a laboratory mill under addition of 5% raw gypsum rock (34.5% $SO_3$) to a Blaine fineness of 3100 $cm^2/g$. ("Pyrolysis gas clinker").

In a parallel test run, clinker of the same composition was produced, with the only difference that no pyrolysis gas, but only conventional natural gas was used for firing the kiln. This clinker, was showed a free lime content of 3.0 percent, was also ground in a laboratory mill to a Blaine fineness of 3100 $cm^2/g$. ("Natural gas clinker").

In testing according to Austrian Cement Standard OE-NORM B 3310, the following results were obtained:

|  | "Pyrolysis Gas Clinker" | "Natural Gas Clinker" |
| --- | --- | --- |
| Blaine Fineness | 3100 $cm^2/g$ | 3100 $cm^2/g$ |
| Begin of Setting | 2 h 35 min | 2 h 20 min |
| End of Setting | 3 h 50 min | 4 h 00 min |
| Compressive Strength |  |  |
| after 3 days | 212 $kp/cm^2$ | 203 $kp/cm^2$ |
| after 28 days | 396 $kp/cm^2$ | 374 $kp/cm^2$ |

The "Pyrolysis Gas Clinker" obtained according to the invention was thus of slightly higher strength.

As already mentioned, the shot through which the flue gases has been passed after leaving the kiln was burned to cement clinker in a conventional manner and this clinker was again ground in the laboratory mill together with 5% crude gypsum rock (34.5% $SO_3$). Testing according to Austrian Cement Standard OE-NORM B 3310 yielded the following differences between the clinker produced from "pyrolysis flue gas shot" and "shot treated with conventional flue gas":

|  | Clinker produced from | |
| --- | --- | --- |
|  | "pyrolysis flue gas shot" | "shot treated with conventional flue gas" |
| Blaine fineness | 3170 $cm^2/g$ | 3180 $cm^2/g$ |
| Begin of Setting | 3 h 25 min | 3 h 05 min |
| End of Setting | 4 h 15 min | 3 h 55 min |
| Compressive Strength |  |  |
| after 3 days | 204 $kp/cm^2$ | 201 $kp/cm^2$ |
| after 28 days | 425 $kp/cm^2$ | 366 $kp/cm^2$ |

While the setting times and initial strengths are virtually equal, the clinker produced from the "pyrolysis flue gas shot" clearly shows higher strengths after 28 days.

It is assumed that this must be attributed to the zinc content imparted to this shot by the pyrolysis flue gases.

The "pyrolysis flue gas shot" showed a zinc content corresponding to 0.3% ZnO, while no zinc was analytically detected in the shot treated with conventional flue gas.

In the same manner, clinker was produced under utilization of pyrolysis gases obtained from the following waste substances:
 (a) scrap tire granulate 8 mm
 (b) scrap tire granulate 1 mm
 (c) chips of polyethylene, polyamide, polypropylene, polyvinyl acetate and latex
 (d) chips of polyvinyl chloride
 (e) grease-saturated waste bleaching earth (f) textile scraps (hosiery, plastic string, etc.)
 (g) abattoir scraps
 (h) sulfite waste liquor
 (i) phenol-containing foundry sand
 (k) contaminated waste oil
 (l) oil-contaminated soil
 (m) plastic lacquer
 (n) faulschlamm (sapropel)

In all these cases, the results were as favorable as those obtained by using scrap tire granulate. In detail, the following results were obtained in testing under Austrian Cement Standard OE-NORM B 3310. All testing mixtures contained 5% crude gypsum with a content of 34.5% $SO_3$ and were of a Blaine fineness of 3050–3150 cm$^2$/g.

| Waste Substances | Begin of Setting h | Begin of Setting min | End of Setting h | End of Setting min | Compressive Strength in kp/cm$^2$ after 3 days | Compressive Strength in kp/cm$^2$ after 28 days |
|---|---|---|---|---|---|---|
| (a) | 2 | 40 | 3 | 50 | 205 | 405 |
| (b) | 2 | 45 | 4 | 00 | 214 | 396 |
| (c) | 2 | 35 | 3 | 45 | 199 | 388 |
| (d) | 1 | 35 | 2 | 20 | 243 | 427 |
| (e) | 3 | 00 | 4 | 10 | 188 | 402 |
| (f) | 2 | 30 | 3 | 40 | 200 | 389 |
| (g) | 3 | 05 | 4 | 10 | 191 | 390 |
| (h) | 2 | 55 | 4 | 00 | 216 | 421 |
| (i) | 2 | 55 | 3 | 45 | 177 | 383 |
| (k) | 3 | 10 | 4 | 05 | 199 | 394 |
| (l) | 3 | 00 | 3 | 50 | 206 | 411 |
| (m) | 3 | 45 | 4 | 40 | 162 | 432 |
| (n) | 2 | 50 | 3 | 40 | 185 | 401 |

The strength development of the clinkers burned from shot treated with pyrolysis gases was favorably influenced when the waste substances contained chloride-, zinc- or lead compounds and these compounds were taken up by the clinker or the raw meal shot via the pyrolysis gases.

Examination of the pyrolysis residues obtained in the pyrolysis of the scrap tire chips showed that 47 percent of the scrap tire granulate were converted to pyrolysis gases. In a separate test, the pyrolysis gases were condensed and their lower (crude) calorific value was found to be 10210 kcal/kg.

The burning kiln was supplied with a total of about 38390 kcal/kg, which constitutes a saving of about 4.5 Nm$^3$ in natural gas.

Because the pyrolysis was carried out under exclusion of air, the pyrolysis residue contained about 70 percent carbon and 30 percent metallic iron. The iron could be picked out by hand, the coke-like residue was used as a fuel in a shaft furnace.

Analysis of the kiln fuel after passing through the raw meal shot bed showed that the flue gas was in all cases composed of carbon dioxide, water and nitrogen as well as traces of oxygen, regardless of whether pyrolysis gases were burned together with the kiln flue gas or not.

In no case did the analysis in the test according to Example 1 and the test runs (a) to (n) show a content in carbon monoxide, hydrocarbon compounds or compounds of chloride, sulfur, zinc, lead or any other heavy metals.

EXAMPLE 2

Grease-saturated bleaching earth (calorific value 5680 kcal/kg) was charged into the pyrolysis vessel described in Example 1 and heated, but not under exclusion of air as in Example 1, instead of air deficiency. The pyrolysis vessel was supplied with just enough air so that a slight amount of oxygen could be detected in the corresponding "pyrolysis gases". Analysis showed that in spite of the excess in oxygen, the "pyrolysis gases" still contained essential amounts of hydrocarbon compounds and carbon monoxide.

It was now attempted to burn these oxidizable components of the pyrolysis gases in a post-burning chamber. It turned out that a temperature of at least 900° C. and an air-excess index of at least 1.8 were required for a critical period (of about 15 minutes) for gases in the post-burning chamber in order to secure complete oxidation of the "pyrolysis gases".

The pyrolysis residue obtained under these conditions was of the following composition:

| | |
|---|---|
| Ignition loss (1000°C.) | 0 % |
| $SiO_2$ | 69.0 % |
| $Al_2O_3$ | 18.3 % |
| $Fe_2O_3$ | 4.2 % |
| CaO | 2.6 % |
| MgO | 2.0 % |
| $SO_3$ | 0.1 % |
| Remainder | 3.2 % |

This residue, barely 50 percent of the dry starting substance, was now ground to a screen fineness 0.06 DIN 4188 (inner mesh 60 μ) and added to Portland cement PZ 375 (Blaine fineness 3680 cm$^2$/g). The following results were obtained in tests according to Austrian Cement Standard OE-NORM B 3310 as compared to blast furnace slag of equal fineness which is, at present, conventionally used as a grinding additive:

| Cement Composition: | | | | | |
|---|---|---|---|---|---|
| PZ 375 | 100% | 85% | 85% | 70% | 70% |
| Pyrolysis Residue | 0% | 15% | — | 30% | — |
| Blast Furnace Slag | 0% | — | 15% | — | 30% |
| Begin of Setting | 3.10 h | 3.25 h | 3.15 h | 4.00 h | 4.15 h |
| End of Setting | 4.25 h | 4.30 h | 4.40 h | 5.10 h | 5.25 h |
| Compressive Strength (kp/cm$^2$) | | | | | |
| after 3 days | 273 | 221 | 229 | 175 | 168 |
| after 28 days | 464 | 442 | 445 | 401 | 403 |
| after 90 days | 572 | 595 | 577 | 554 | 563 |

Admixing the pyrolysis residue with PZ 375 thus has no detrimental effect; it even improved the strengths at the laster terms, particularly as compared to the grinding additive conventionally used at present.

The tests according to Example 2 yielded essentially the same results with respect to of fuel saving and purity of the gases, as obtained in Example 1 and the test runs (a) to (n) in Example 1.

What is claimed is:

1. Apparatus for carrying out the process for the utilization of waste substances containing combustible components and showing fluctuations in their composition and properties, in their water content, in their content of components undergoing endothermic reactions at heating or in their calorific value, said process comprising subjecting the waste substances to decomposition under liberation of their volatile components by means of incomplete combustion and of burning the gases thus formed, comprising a first heating means for volatilizing, decomposing and incompletely burning the waste substances to produce pyrolysis gases and a second heating means to burn the pyrolysis gases immediately after they are produced.

2. In a process for the utilization of waste substances containing combustible components and showing fluctuations in their composition and properties, in their water content, in their content of components undergoing endothermic reactions at heating or in their calorific value, said process comprising the steps of subjecting the waste substances to decomposition under liberation of their volatile components by means of incomplete combustion and of burning the gases thus formed, the improvement comprising heating the waste substances in a first heating zone to volatilize them, to decompose them and to burn them incompletely, thus producing pyrolysis residue and pyrolysis gas, conducting the pyrolysis gas to a remote burner in a second heating zone, introducing conventional fuel into a separate burner in the second heating zone, burning building materials or inorganic binders with the pyrolysis gas and conventional fuel in the second heating zone and discharging the pyrolysis residue formed in the first heating zone.

3. A process for using volatile- and combustible-component containing waste which varies in composition, in properties, in water content, in content of components which undergo endothermic reactions when heated or in calorific value and which comprises:
  (a) burning the waste incompletely, thus decomposing it and liberating its volatile components and volatile incomplete-combustion products as pyrolysis gas, and
  (b) burning, immediately following formation of the pyrolysis gas, starting raw material for building materials or inorganic binder with fuel comprising said pyrolysis gas.

4. A process according to claim 3 wherein burning (b) comprises burning starting raw material for cement clinker at a temperature in excess of 600° C.

5. A process according to claim 3 wherein burning (b) comprises burning the pyrolysis gas together with conventional fuel and controlling the amount of conventional fuel by measuring or determining the heating state of the substance being burned by the fuel and regulating, adjusting or maintaining the level of total heating power accordingly.

6. A process according to claim 5 which comprises controlling the amount of conventional fuel by the temperature of said substance being burned.

7. A process according to claim 6 wherein burning (b) comprises sintering the substance being burned and the ratio of the pyrolysis gas of conventional fuel is controlled by the sintering temperature.

8. A process according to claim 6 wherein burning (b) comprises calcining the substance being burned and the ratio of the pyrolysis gas to conventional fuel is controlled by the temperature of said substance on termination of the calcining.

9. A process according to claim 5 wherein burning (b) comprises decarbonation of the substance being burned and the ratio of the pyrolysis gas to convention fuel is controlled by the degree of decarbonation of said substance.

10. A process according to claim 9 wherein burning (b) comprises effecting a degree of decarbonation by sintering the substance being burned and the ratio of the pyrolysis gas to conventional fuel is controlled by the degree of decarbonation of the sintered substance.

11. A process according to claim 9 wherein burning (b) comprises effecting a degree of decarbonation by calcining the substance being burned and the ratio of the pyrolysis gas to conventional fuel is controlled by the degree of decarbonation of the calcined substance.

12. A process according to claim 5 wherein burning (b) comprises burning starting raw material for cement clinker at a temperature in excess of 600° C.

13. A process according to claim 3 wherein burning (a) is effected under a pressure of from 2.84 to 11.38 psi.

14. A process according to claim 3 which comprises adjusting and keeping substantially constant the burning (a) temperature by increasing the amount of gas removed when the temperature increases and reducing the amount of gas removed when the temperature decreases.

15. A process according to claim 3 which comprises adjusting and keeping substantially constant the burning (a) temperature by varying the rate of charging said waste into and the period of time for subjecting it to burning (a).

16. A process according to claim 3 which comprises introducing additional heat into burning (a) in the form of substance previously subjected to burning (b).

17. A process according to claim 3 which comprises introducing kiln flue gas formed in burning (b) to burning (a), which is effected within a temperature range of from 300° to 800° C.

18. A process according to claim 3 which comprises cooling substance subjected to burning (b) with gas passed in heat-exchange relationship thereto and introducing the thus-heated gas into burning (a), which is effected within a temperature range of from 300° to 800° C.

19. A process according to claim 3 which comprises at least partially adding pyrolysis residue formed in burning (a) to substance being burned by fuel during (b).

20. A process according to claim 3 which comprises adding pyrolysis residue formed during burning (a) to other components used in producing or processing hydraulic binder.

* * * * *